(12) United States Patent
Yamashita et al.

(10) Patent No.: US 11,782,027 B2
(45) Date of Patent: Oct. 10, 2023

(54) DETERIORATION PREDICTION DEVICE FOR MAGNETIC BODY AND DETERIORATION PREDICTION METHOD FOR MAGNETIC BODY

(71) Applicant: SHIMADZU CORPORATION, Kyoto (JP)

(72) Inventors: Mitsuo Yamashita, Kyoto (JP); Hiroaki Kodama, Kyoto (JP); Taketoshi Noji, Kyoto (JP); Makoto Shinohara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 7 days.

(21) Appl. No.: 17/617,502

(22) PCT Filed: May 14, 2020

(86) PCT No.: PCT/JP2020/019232
§ 371 (c)(1),
(2) Date: Dec. 8, 2021

(87) PCT Pub. No.: WO2020/250617
PCT Pub. Date: Dec. 17, 2020

(65) Prior Publication Data
US 2022/0229018 A1 Jul. 21, 2022

(30) Foreign Application Priority Data
Jun. 14, 2019 (JP) .................. 2019-111571

(51) Int. Cl.
*G01N 27/83* (2006.01)
(52) U.S. Cl.
CPC .................. *G01N 27/83* (2013.01)
(58) Field of Classification Search
CPC ....................................... G01N 27/83
(Continued)

(56) References Cited

U.S. PATENT DOCUMENTS 6,684,349 B2 * 1/2004 Gullo ............... G06F 11/008
714/E11.02
8,180,466 B2 * 5/2012 Longsdorf ......... G05B 19/0425
702/182
(Continued)

FOREIGN PATENT DOCUMENTS

| CN | 102636561 B | 7/2015 |
|----|-------------|--------|
| JP | 2005055341 A | 3/2005 |

(Continued)

OTHER PUBLICATIONS

Rajani, Balvant, and Yehuda Kleiner. "Non-destructive inspection techniques to determine structural distress indicators in water mains." Evaluation and Control of Water Loss in Urban Water Networks 47 (2004): 21-25. (Year: 2004).*

(Continued)

*Primary Examiner* — Christopher P McAndrew
(74) *Attorney, Agent, or Firm* — Muir Patent Law, PLLC (57) ABSTRACT

A deterioration prediction device for a magnetic material is provided with: a magnetic sensor configured to detect a magnetic field affected by a magnetic body (W) as an inspection target and outputs a sensor signal; a deterioration score calculation means (51) configured to calculate a deterioration score indicating the degree of deterioration of the magnetic body based on the sensor signal; a deterioration score storage unit (41) configured to store the deterioration score; a deterioration prediction model storage unit configured to store a deterioration prediction model indicating a change in the degree of deterioration; a deterioration prediction model update means (52) configured to update the deterioration prediction model to acquire an updated deterioration prediction model; and a deterioration score prediction means (53) configured to estimate a future deterioration score.

9 Claims, 3 Drawing Sheets

(58) Field of Classification Search
USPC .......................................................... 324/240
See application file for complete search history.

(56) References Cited

U.S. PATENT DOCUMENTS

| | | | | |
|---|---|---|---|---|
| 9,165,414 | B2* | 10/2015 | Karnik | .................. G07C 5/0816 |
| 2009/0097735 | A1* | 4/2009 | Sasajima | .................. G06T 7/001 |
| | | | | 382/141 |
| 2010/0133046 | A1* | 6/2010 | Allwardt | .................. B66B 7/123 |
| | | | | 187/251 |

FOREIGN PATENT DOCUMENTS

| | | | |
|---|---|---|---|
| JP | 2010-254394 A | 11/2010 | |
| JP | 2014-213973 A | 11/2014 | |
| JP | 2014-234260 A | 12/2014 | |
| MY | 150395 A | 1/2014 | |
| WO | 2007116884 A1 | 10/2007 | |

OTHER PUBLICATIONS

Written Opinion by the International Search Authority for corresponding PCT application No. PCT/JP2020/019232, dated Jun. 15, 2020, submitted with a machine translation.
Office Action dated Dec. 26, 2022 for corresponding Singapore Patent Application No. 11202113114R.
Notice of Reasons for Refusal dated Jul. 12, 2022 for corresponding Japanese Patent Application No. JP 2021-525952, submitted with a machine translation.
Extended European Search Report (EESR) dated Jun. 16, 2023 in the corresponding European patent application No. 20821990.7.
First Office Action dated Mar. 6, 2023 issued in relation to the corresponding Chinese Patent Application No. 202080035521.4 together with an machine English translation thereof.

* cited by examiner

Transition of deterioration score Di

Number of times (×1000)

DETERIORATION PREDICTION DEVICE FOR MAGNETIC BODY AND DETERIORATION PREDICTION METHOD FOR MAGNETIC BODY

TECHNICAL FIELD

The present invention relates to a deterioration prediction device for a magnetic body and a deterioration prediction method for a magnetic body.

BACKGROUND ART

Conventionally, a technique for predicting the service life of a wire rope is known in which the service life is predicted by the calculation from the operation history information on crane equipment or an elevator system adopting a wire rope (see, e.g., Patent Document 1). Further, an attempt has been made to predict the time for replacing a wire rope by providing a weakened portion at a part of the wire rope and detecting a disconnection of the portion (see, e.g., Patent Document 2).

PRIOR ART DOCUMENT

Patent Document

Patent Document 1: Japanese Unexamined Patent Application Publication No. 2014-234260
Patent Document 2: Japanese Unexamined Patent Application Publication No. 2010-254394

SUMMARY OF THE INVENTION

Problems to be Solved by the Invention

However, the method of predicting the service life from the operation history information or the method of intentionally providing a weakened portion does not detect the physical condition of the wire rope itself as an inspection target. Therefore, it becomes important to replace at an appropriate timing by acquiring a prediction result more reflecting the wire rope state as an inspection target. According to one aspect of the present invention, an object of the present invention is to solve the problem and provide a deterioration prediction device for a magnetic body and a deterioration prediction method for a magnetic body with higher accuracy.

Means for Solving the Problem

A deterioration prediction device for a magnetic body according to a first aspect of the present invention, is provided with:
- a magnetic sensor configured to detect a magnetic field affected by a magnetic body as an inspection target and output a sensor signal;
- a deterioration score calculation means configured to calculate a deterioration score indicating a degree of deterioration of the magnetic body, based on the sensor signal;
- a deterioration score storage unit configured to store the deterioration score;
- a deterioration prediction model storage unit configured to store a deterioration prediction model indicating a change in the degree of deterioration;
- a deterioration prediction model update means configured to update the deterioration prediction model based on the deterioration score at a plurality of time points to acquire an updated deterioration prediction model; and
- a deterioration score prediction means configured to estimate a future deterioration score or a life of the magnetic body from the updated deterioration prediction model.

A deterioration prediction method for a magnetic body according to a second aspect of the present invention, includes:
- a sensor signal acquisition step of acquiring a sensor signal by detecting a magnetic field affected by a magnetic body as an inspection target by a magnetic sensor;
- a sensor signal acquisition step of acquiring a sensor signal by detecting a magnetic field affected by the magnetic body as an inspection target by the magnetic sensor;
- a deterioration score calculation step of calculating a deterioration score indicating a degree of deterioration of the magnetic body, based on the sensor signal;
- a deterioration prediction model update step of updating a deterioration prediction model indicating a change in the degree of deterioration based on the deterioration score at a plurality of time points to acquire an updated deterioration prediction model; and
- a deterioration score estimation step of estimating a future deterioration score from the updated deterioration prediction model.

Effects of the Invention

According to the first and second aspects of the present invention, it is possible to provide a higher accuracy deterioration prediction device for a magnetic body and a higher accuracy deterioration prediction method for a magnetic body.

EMBODIMENTS FOR CARRYING OUT THE INVENTION

Description of Configuration

Figure 1:
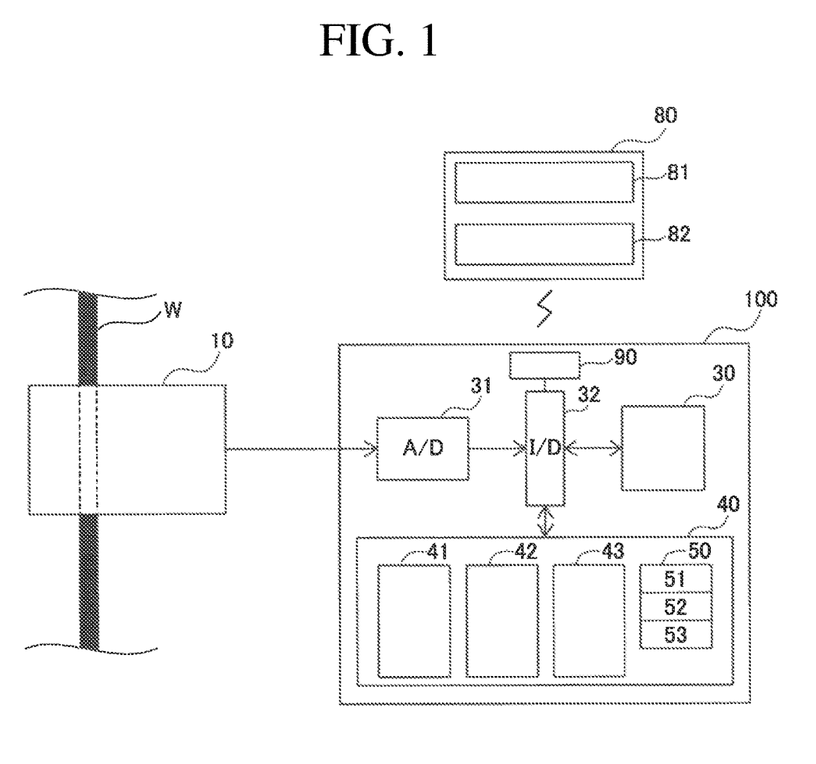
FIG. 1 is a diagram for explaining an entire structure of a deterioration prediction device for a magnetic body.

An embodiment of the present invention will be described.
As shown in FIG. 1, the deterioration prediction device for a magnetic body according to one embodiment of the present invention is provided with a magnetic sensor 10, a deterioration score calculation means, a deterioration score storage unit 41, a deterioration prediction model storage unit 42, a deterioration prediction model update means, a display 81, and a registration unit 82.

The magnetic sensor 10 detects a magnetic field affected by a wire rope W as an inspection target and outputs a sensor signal Si. The deterioration score calculation means acquires a sensor signal Si as time-series data, converts the sensor signal Si of the time series into a sensor signal sequence S(x) relating to the position of the wire rope W, and stores the sensor signal Si in a sensor signal storage unit 43. The deterioration score calculation means calculates a deterioration score Di indicating the degree of deterioration of the wire rope W, based on the sensor signal sequence S(x). The deterioration score storage unit 41 stores the deterioration score D1, D2, . . . Dn at a plurality of time points. The deterioration prediction model storage unit 42 stores a deterioration prediction model Mo indicating a change in the degree of deterioration. The deterioration prediction model update means updates the deterioration prediction model Mo based on the deterioration score at a plurality of time points and acquires the updated deterioration prediction model Ma. The deterioration score prediction means estimates a future deterioration score Df from the updated deterioration prediction model Ma. The display 81 displays the updated deterioration prediction model Ma and the estimated future deterioration score Df. The registration unit 82 registers the deterioration prediction model Mo.

Note that the wire rope W is an example of the "magnetic body" as recited in claims. Further note that the deterioration prediction device for a magnetic body according to an embodiment of the present invention includes a computer 100.

The computer 100 includes a CPU (Central Processing Unit) 30, an A/D converter 31, an VD converter 32, a non-volatile memory 40, and a transmitting/receiving unit 90. The CPU 30, the A/D converter 31, the non-volatile memory 40, and the transmitting/receiving unit 90 are connected to each other via an VD converter 32 that I/D converts analog signals into analog signals.

The deterioration score storage unit 41, the deterioration prediction model storage unit 42, the sensor signal storage unit 43, and the program storage unit 50 are provided in the non-volatile memory 40 of the computer 100. The deterioration score calculation means according to this embodiment is realized by reading and executing a deterioration score calculation module 51, which is a module of programs stored in the program storage unit 50, by the CPU 30. The deterioration prediction model update means is realized by reading and executing a deterioration prediction model update module 52, which is a module of programs stored in the program storage unit 50, by the CPU 30. The deterioration score prediction means is realized by reading and executing a deterioration score prediction module 53, which is a module of programs stored in the program storage unit 50, by the CPU 30.

That is, the deterioration score calculation module 51 is an example of the "deterioration score calculation means" as recited in claims. The deterioration prediction model update module 52 is an example of the "deterioration prediction model update means" as recited in claims. Further, the deterioration score prediction module 53 is an example of the "deterioration score prediction means" as recited in claims.

In this embodiment, the deterioration prediction device for a magnetic body is further provided with the display 81 for displaying the updated deterioration prediction model Ma and a registration unit 82 for registering a deterioration prediction model Ma. The registration unit 82 includes a touch panel and is configured to accept operations from a user. That is, the registration unit 82 is configured to be able to register the deterioration prediction model Ma.

Configuration of Magnetic Sensor 10

Figure 2:
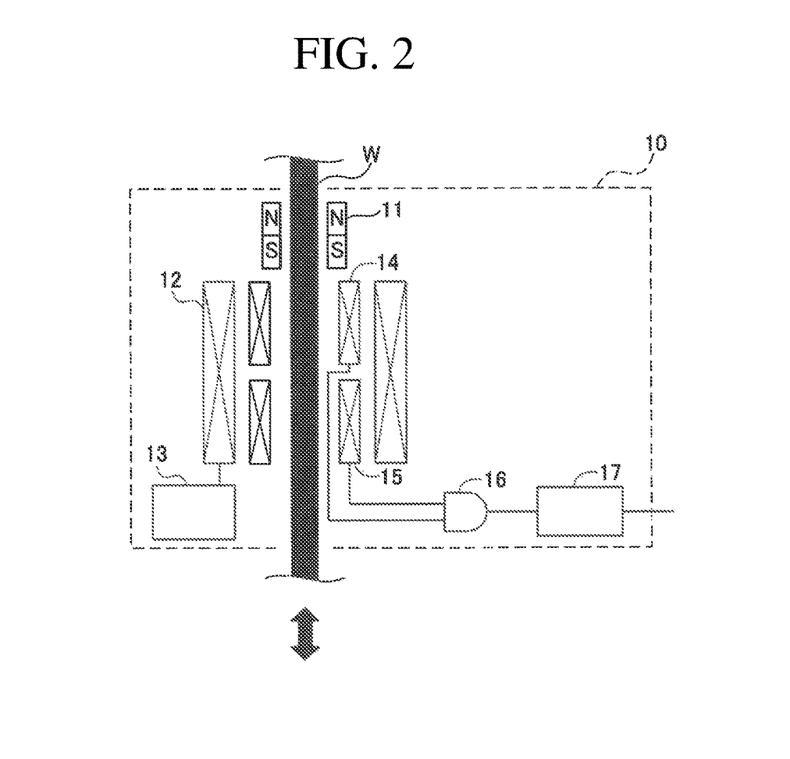
FIG. 2 is a diagram for explaining a configuration of a magnetic sensor.

As shown in FIG. 2, the magnetic sensor 10 is provided with a magnetization magnet 11, an excitation coil 12, an excitation control unit 13, a detection coil 14, a detection coil 15, a differential circuit 16, and a current-voltage conversion circuit 17. The magnetization magnet 11 magnetizes the wire rope W. The excitation coil 12 is arranged so as to surround the wire rope W. The excitation control unit 13 supplies an AC current to the excitation coil 12 to generate an AC magnetic field in the excitation coil 12. The detection coil 14 and the detection coil 15 each are disposed in a space between the excitation coil 12 and the wire rope W, so the wire rope W is substantially arranged to across the closed-loop of the coils. The differential circuit 16 outputs the difference of the currents flowing through the detection coils 14 and 15. The current-voltage conversion circuit 17 converts the current as an output of the differential circuit 16 to a voltage and outputs it as a sensor signal Si. The magnetic sensor 10 is configured to detect the magnetic field affected by the wire rope W as an inspection target.

Figure 3:
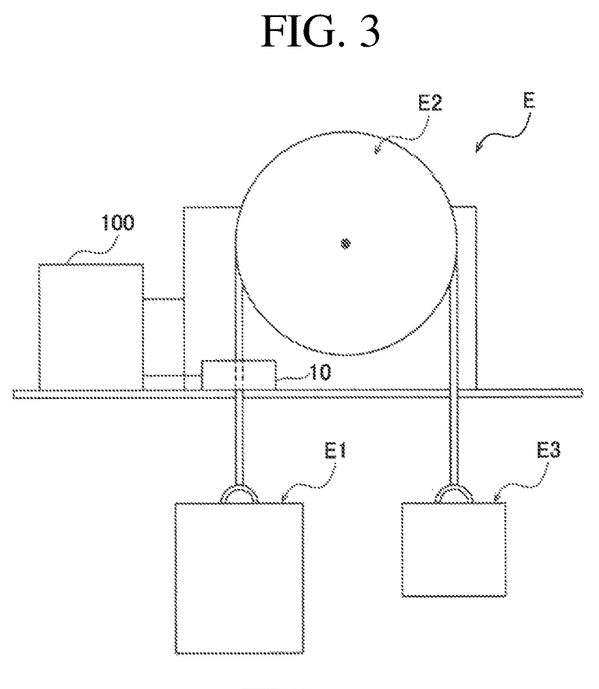
FIG. 3 is a diagram for explaining the application to an elevator system.

FIG. 3 shows an example in which the deterioration prediction device for a magnetic body is applied to an elevator system E. In the elevator system E, one end of the wire rope W is coupled to a cage E1 of the elevator, and the other end thereof is coupled to a weight E3. When the weight E3 moves downward, the wire rope W is driven by the rotational force of the winding machine E2 and the frictional force of the wire rope W, thereby raising the cage E1 of the elevator.

As shown in FIG. 3, the magnetic sensor 10 is arranged between the cage E1 and the winding machine E2 of the elevator such that the wire rope W passes through the body of the magnetic sensor 10.

Processing Procedures

Figure 4:
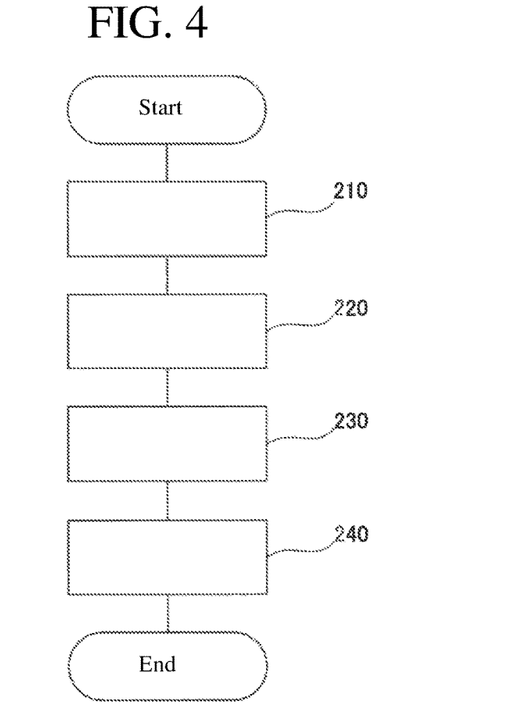
FIG. 4 is a flowchart showing an example of an operation of a program.

The processing of each program will be described with reference to the flowchart of FIG. 4.

Sensor Signal Acquisition Step 210

In this Step, the CPU 30 executes the deterioration score calculation module 51 read from the program storage unit 50 and operates as follows. First, by the CPU 30, the current sensor signal Si is acquired from the A/D converter 31, and the current winding position X of the winding machine E2 is obtained. Then, the sensor signal Si and the winding position X are stored in the sensor signal storage unit 43 in the non-volatile memory 40 in an associated manner. This operation is performed every predetermined time or every predetermined winding position X. With this, a sensor signal sequence S(X) for each position of the wire rope W is generated.

The sensor signal acquisition step 210 may always be executed asynchronously with other Steps. It may be configured such that the sensor signal acquisition step 210 is performed, for example, when moving the wire rope W once at the time of the inspection of the elevator system E and then proceeds to the next Step 220 and subsequent Steps.

The sensor signal sequence S(X) is preferably configured to take the difference from the sensor signal sequence So(X) acquired at the time of the installation of the wire rope W, since it becomes possible to extract only the change in the signal caused by deterioration. It should be noted, however, that the differentiation processing is not essential.

In addition, this Step can be variously changed as long as the sensor signal is acquired at a plurality of time points and stored.

Deterioration Score Calculation Step 220

In this Step, the CPU 30 executes the deterioration score calculation module 51 read from the program storage unit 50 as follows.

First, the CPU 30 reads the sensor signal sequence S(X) from the sensor signal storage unit 43. In this embodiment, a magnetic sensor of a total magnetic flux method (total magnetic flux method) shown in FIG. 2 is adopted as the magnetic sensor 10. That is, the sensor 10 is configured such that the wire rope W as an inspection target passes through the inside of the closed-loop of the detection coils 14 and 15. Therefore, even in a case where there is a wire disconnection inside the wire rope W, the change in the magnetic field caused by the disconnection appears as a change in the current flowing through the detection coils 14 and 15. Therefore, from the situation in which no disconnection can be visually recognized on the wire rope W, a change appears in the sensor signal Si, i.e., the sensor signal sequence S(X). Therefore, it is possible to perform the deterioration state determination with extremely high precision.

Figure 5:
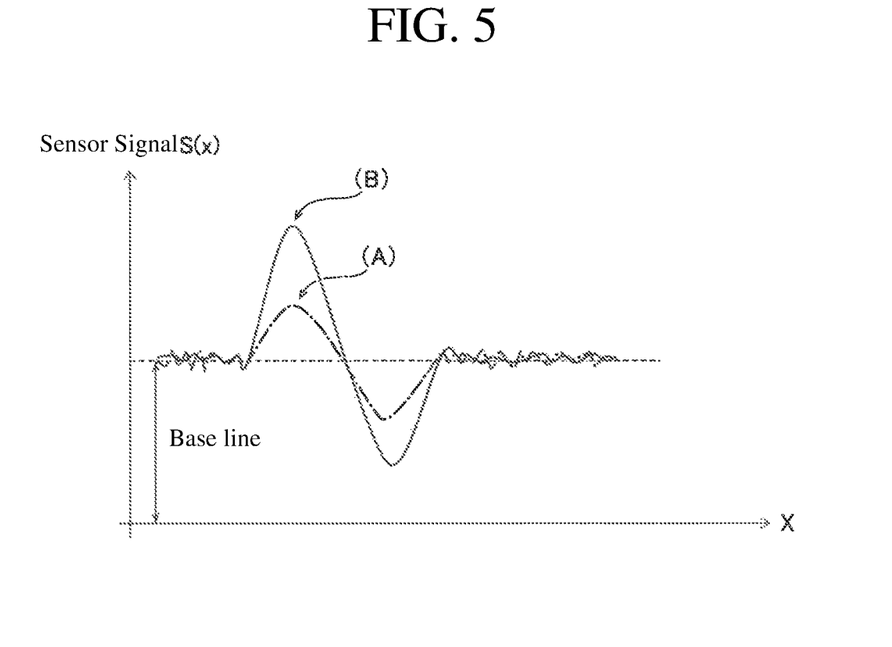
FIG. 5 is a diagram showing a waveform of a sensor signal sequence $S(x)$ at the time of a wire disconnection.

For example, at a location where a wire disconnection is present, a waveform as shown in (A) of FIG. 5 is observed. Further, in a case where the number of wire disconnections in the same cross-section of the wire rope W is increased, a waveform as shown in (B) of FIG. 5 is observed. That is, as the number of wire disconnections increases, the amplitude of the characteristic waveform as shown in FIG. 5 increases. Therefore, it becomes possible to estimate the number of wire disconnections.

In this embodiment, as described above, the number of wire disconnections is calculated (estimated) over a predetermined section of interest of the wire rope W, and the maximum value of the number of the wire disconnections is stored in the deterioration score storage unit 41 as a deterioration score Di together with the date of acquisition of the sensor signal Si. As a result, the deterioration scores Di at a plurality of time points are accumulated in the deterioration score storage unit 41. The predetermined section of interest denotes, for example, a section of the wire rope W that passes through a pulley at least once and a section in which a load is applied and therefore the deterioration prediction is required. The predetermined section of interest of the wire rope W is registered by the registration unit 82.

Note that in this embodiment, the deterioration score Di is the largest value of the predetermined section of interest of the wire rope W, but the present invention is not limited thereto. For example, the sum of deterioration scores (the number of wire disconnections) calculated at each location may be set to the deterioration score Di. Further, the section of interest may be further divided, and the deterioration score Di may be calculated for each of the sub-divisions. In addition, various scoring methods may be adopted as long as the signal detected by the magnetic sensor is converted to the degree of deterioration of the wire rope W.

Figure 6:
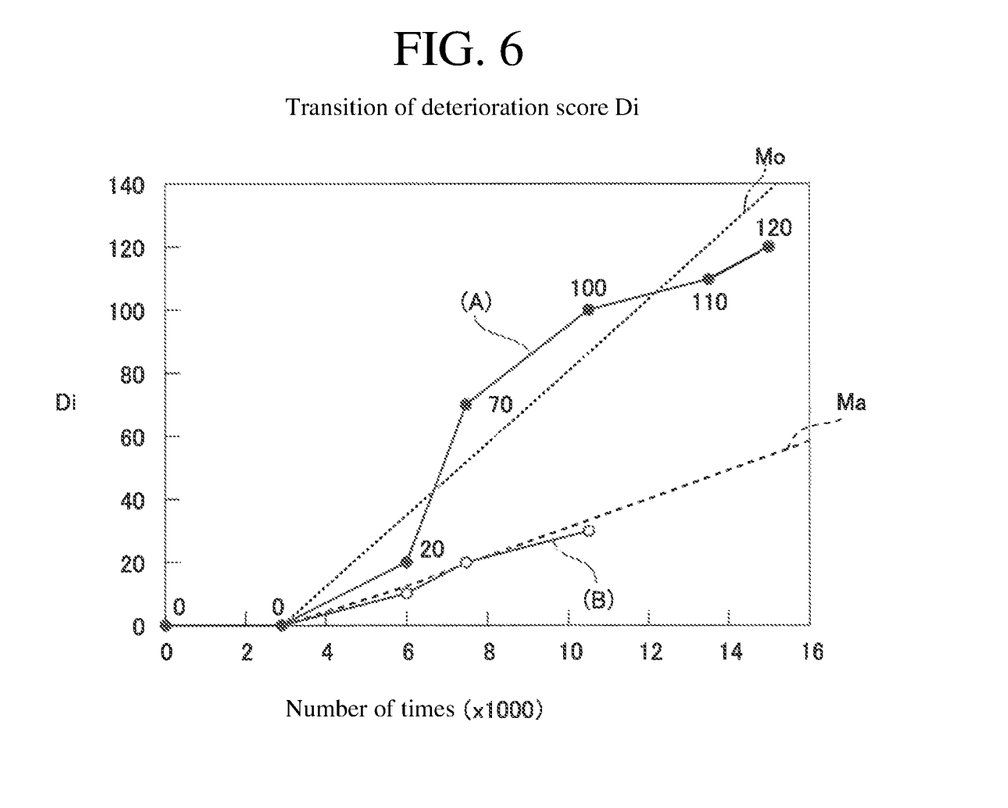
FIG. 6 is a diagram showing a transition of a deterioration score Di.

(A) in FIG. 6 shows the transition of the deterioration score Di acquired at the time of the execution in the deterioration score calculation step 220 using a magnetic sensor of the same type as that of the magnetic sensor 10 while repeatedly applying a load to a reference standard of a wire rope W with a fatigue testing machine. Note that the horizontal axis represents the number of times of tests, and the vertical axis represents the deterioration score Di.

It can be seen from the graph that the deterioration score Di increases continuously. However, from the appearance of the wire rope W, one wire disconnection could be visually confirmed when the number of times of tests has exceeded about 11,000 times. When the number of times of tests has reached about 13,000 times, the second wire disconnection could be visually confirmed. After that, the wire rope has reached the complete disconnection when the number of times of tests has reached about 15,000 times. As described above, the wire rope has suddenly reached the complete disconnection in a state in which the degree of deterioration of the wire rope W cannot be visually recognized. However, it was confirmed that the deterioration score Di increased continuously even during which the change in the appearance could not be visually recognized. This indicates that the wire disconnection is in progress inside the wire rope.

Note that in this embodiment, the deterioration prediction model Mo includes a set of deterioration scores Di. The deterioration score Di is calculated based on a sensor signal output from a sensor of the same type as the magnetic sensor 10 each time a load is applied to a wire rope of the same type (reference product of a wire rope W) as the wire rope W at a plurality of time points.

Further, the deterioration prediction method for a magnetic body according to this embodiment includes a step of preparing a deterioration prediction model Mo. This deterioration prediction model Mo includes a set of deterioration scores Di calculated based on a sensor signal output from a sensor of the same type as the magnetic sensor 10 each time a load is applied to a standard product of a wire rope W at a plurality of time points.

Further, from the graph, no change in the signal could be confirmed until the number of times of tests has reached about 2,500 times, and after the start of internal disconnection, the number of wire disconnections tends to increase approximately linearly. For this reason, it can be understood that the deterioration prediction model Mo can be handled as a linearly approximated model after the detection of disconnection.

However, even if a typical deterioration prediction model Mo is prepared, the load and the torque applied to the wire rope W and the bending curvature of the wire rope W differ depending on the device in the field.

Therefore, in this embodiment, a deterioration prediction model update step 230 is executed.

Deterioration Prediction Model Update Step 230

This step is executed as follows in which the CPU 30 executes the deterioration prediction model update module 52 read from the program storage unit 50.

First, the CPU 30 reads out deterioration scores Di at a plurality of time points from the deterioration score storage unit 41, and reads out a typical deterioration prediction model Mo from the deterioration prediction model storage unit 42.

In this embodiment, the typical deterioration prediction model Mo is a two-line approximate model acquired from (A) in FIG. 6. When the parameters of the model are input in advance by the registration unit 82 of the tablet terminal 80 (see FIG. 1), the typical deterioration prediction model Mo is stored in the deterioration prediction model storage unit 42 through the transmitting/receiving unit 90. Specifically, the typical deterioration prediction model Mo is expressed as follows:

$$Di = Ax + B$$

$$0 < x <= 2500; A=0, B=0$$

$$2500 < x; A=0.01, B=-25$$

where x denotes the number of times of operations of the elevator system E. The number of operations counts the operation from the departure of the elevator system E from the current floor to the arrival to the target floor as one time.

Here, while the elevator system E is running, when the deterioration score calculation step 220 is executed successively, it is assumed that there is a transition as shown in (B) in FIG. 6. In this case, since the degradation progresses at the time point of 11,500 times, the typical deterioration prediction model Mo is updated such that the actually observed deterioration score Di fits to acquire the updated deterioration prediction model Ma.

$$Di = Ax + B$$

$$0 < x <= 2500; A=0, B=0$$

$$2500 < x; A=0.004, B=-10$$

It may be configured such that the updated deterioration prediction model Ma generated (updated) last time is updated sequentially such that the deterioration score D1, D2 ... Dn at the plurality of time points fits. Further, various methods may be employed as long as the originally prepared deterioration prediction model Mo is updated based on the subsequently generated deterioration score Di.

Note that in this embodiment, as the deterioration prediction model Mo, a two-linear approximation model is used, but the deterioration prediction model Mo may be a multidimensional approximation curve model or a spline approximation model. Further, various models may be selected as long as the function increases with respect to the number of times of operation.

However, in a case where an unusual load is applied to the wire rope W due to an earthquake, a fire, etc., the deterioration score Di may change nonlinearly at that point. If the updated deterioration prediction model Ma is determined so as to fit the deterioration score Di before and after such a specific event, it is highly likely to be predicted that the fracture will occur in an extremely shorter period than the original time.

Therefore, it is possible to acquire the sudden occurrence information indicating the occurrence of an unexpected event, such as, e.g., an earthquake and a fire, and the standard deterioration prediction model Mo is updated such that only the deterioration score Di after the sudden occurrence information fits. With this, it is possible to further improve the prediction accuracy.

Note that the sudden information may be generated by judging that an unexpected event has occurred before the deterioration score Di whose standard deviation is greater than or equal to a certain value when linearly approximating the deterioration score Di. That is, the sudden occurrence information may be determined based on a result of detection of the occurrence of an external factor by another means, or may be determined based on a sudden change in the deterioration score Di.

The unexpected event here includes events, such as, e.g., an earthquake, a fire, a lightning strike, flooding, and maintenance, in which effects that differ effects under normal operating conditions are added to the magnetic body as an inspection target.

Preferably, the transition of the updated deterioration prediction model Ma acquired as described above and the deterioration score Di up to the present are transmitted through the transmitting/receiving unit 90 to the tablet terminal 80 and graphically displayed on the display 81 of the tablet terminal 80. This allows maintenance personnel and a building owner to confirm the degree of deterioration in real-time. In particular, the magnetic sensor 10 and the computer 100 may be located where access is difficult. Therefore, it is more desirable to enable communication between the computer 100 and the tablet terminal 80 by wireless communication through an Internet line (LTE line), a telephone line, or the like.

Deterioration Score Estimation Step 240

From the updated deterioration prediction model Ma acquired as described above, the future deterioration score Df is predicted. In a case where the number of times of operation of the elevator system E up to the wire rope disconnection level is predicted, the number x of times the future deterioration score Df calculated by the updated deterioration prediction model Ma exceeds a threshold may be determined. The threshold may be determined based on the number of times of operation of the elevator system E whose wire rope disconnection has been confirmed by a test with a fatigue tester in the same manner as in the case of, for example, acquiring the deterioration score Di in (A) of FIG. 6. This allows the life prediction of the wire rope W. Conversely, it may be used to calculate the deterioration score Di after a predetermined number of times of operation. The number of times x acquired as described above may be displayed on the display 81 as it is. Alternatively, a value acquired by converting the number of times x into the number of days may be displayed based on the average number of times of operation in the unit period of the device. The updated deterioration prediction model Ma and the transition of the deterioration score Di up to the present may be displayed together.

In this embodiment, a system is shown in which the wire rope W moves with respect to the deterioration prediction device for a magnetic body, but the present invention may be applied to a system in which the deterioration prediction device for a magnetic body moves with respect to the wire rope W. For example, a pendant rope in a crane, a stay in a ropeway, a hanger rope, or a PC cable attached to a suspension bridge or a PC bridge is fixed. However, these are magnetic bodies accompanied by material deterioration due to continuous application of a load in the operating environment. Therefore, it is useful to cause the deterioration prediction device for a magnetic body to manually or robotically scan to measure the deterioration state. In this case, time may be used as a parameter instead of the number of times of operation.

Further, in this embodiment, an example is shown in which a wire rope W is a magnetic body as an inspection target, but the present invention is not particularly limited as long as it is a magnetic body that is deteriorated in terms of materials due to continuous application of loads in the use environment. For example, a magnetic body, which is an inspection target, may be a stainless-steel rope, a stranded wire made of twisted wires, a thin plate, a square timber, a cylindrical pipe, a wire, or a chain. The magnetic body as an inspection target may be a wire rope W coated with a resin, plating, or the like. Further, the magnetic body as an inspection target may be a cable or the like constituting a wire rope W. For example, the present invention may be applied to predict corrosion degradation of a reinforcement in a pier or concrete. In this case, time may be used as a parameter instead of the number of times of operation.

Further, in this embodiment, an example is shown in which the magnetic sensor 10 is arranged between the cage E1 and the winding machine E2 of the elevator, but the arrangement of the magnetic sensor in the present invention is not limited thereto. The arrangement of the magnetic sensor can be anywhere in a position where the section passing through the pulley can be measured, for example, between the winding machine E2 and the weight E3.

Furthermore, in this embodiment, an example is shown in which the wire rope W is driven by the rotational force of the winding machine E2 and the frictional force of the wire rope W, but the driving method of the wire rope W is not limited thereto. For example, another driving method such as winding may be used.

Further, in a case where local kink or rust has been detected by the magnetic sensor 10, it may be displayed on the display 81 of the tablet terminal 80 together with the deterioration score Di in this embodiment. This makes it possible to determine the urgency of maintenance and the action to be taken, as a parameter independent of the deterioration score Di according to the number of wire disconnections.

Further, in this embodiment, an example is shown in which the transition of the deterioration score Di and the like is transmitted to the tablet terminal 80 through the transmitting/receiving unit 90, but the present invention is not limited thereto. Instead of a tablet terminal, it may be transmitted to, for example, a PC of a maintenance company or a central monitoring board of a disaster prevention center.

Further, in this embodiment, for convenience of explanation, the description has been made using a flow-driven flowchart in which the operation of the programs by the deterioration prediction device for a magnetic body according to the present invention is sequentially processed along the processing flow, but the present invention is not limited thereto. In the present invention, the operation of programs by the deterioration prediction device for a magnetic body may be performed by event-driven processing that executes processing on an event-by-event basis. In this case, the processing of the control unit may be performed in a complete event-driven fashion or in combination of event-driven type processing and flow-driven type processing.

The present specification encompasses the following inventions.

Invention 1

A deterioration prediction device for a magnetic body, comprising:
  a magnetic sensor configured to detect a magnetic field affected by a magnetic body as an inspection target and output a sensor signal;
  a deterioration score calculation means configured to calculate a deterioration score indicating a degree of deterioration of the magnetic body, based on the sensor signal;
  a deterioration score storage unit configured to store the deterioration score;
  a deterioration prediction model storage unit configured to store a deterioration prediction model indicating a change in the degree of deterioration;
  a deterioration prediction model update means configured to update the deterioration prediction model based on the deterioration score at a plurality of time points to acquire an updated deterioration prediction model; and
  a deterioration score prediction means configured to estimate a future deterioration score or a life of the magnetic body from the updated deterioration prediction model.

Invention 2

The deterioration prediction device for a magnetic body as recited in the above-described Invention 1,
  wherein when an unexpected event is detected, the deterioration prediction model update means updates the deterioration prediction model based on the deterioration score at a plurality of time points after the detection of the unexpected event to acquire the updated deterioration prediction model.

Invention 3

The deterioration prediction device for a magnetic body as recited in the above-described Invention 1 or 2,
  wherein the magnetic body is a wire rope.

Invention 4

The deterioration prediction device for a magnetic body as recited in any one of the above-described Inventions 1 to 3, further comprising:
  a registration unit configured to register at least one of a predetermined section of interest of the magnetic body and the deterioration prediction model.

Invention 5

The deterioration prediction device for a magnetic body as recited in the above-described Invention 2,
  wherein the unexpected event includes at least one of an earthquake, a fire, a lightning strike, flooding, and maintenance.

Invention 6

The deterioration prediction device for a magnetic body as recited in any one of the above-described Inventions 3 to 5,
  wherein the magnetic sensor detects the magnetic field by a total magnetic flux method.

Invention 7

The deterioration prediction device for a magnetic body as recited in any one of the above-described Inventions 3 to 5,
  wherein the deterioration prediction model includes a set of deterioration scores calculated based on a sensor signal output from a sensor of the same type as the magnetic sensor each time a load is applied to a wire rope of the same type as the wire rope at a plurality of time points.

Invention 8

A deterioration prediction method for a magnetic body, comprising:
- a sensor signal acquisition step of acquiring a sensor signal by detecting a magnetic field affected by a magnetic body as an inspection target by a magnetic sensor;
- a deterioration score calculation step of calculating a deterioration score indicating a degree of deterioration of the magnetic body, based on the sensor signal;
- a deterioration prediction model update step of updating a deterioration prediction model indicating a change in the degree of deterioration based on the deterioration score at a plurality of time points to acquire an updated deterioration prediction model; and
- a deterioration score estimation step of estimating a future deterioration score from the updated deterioration prediction model.

Invention 9

The deterioration prediction method for a magnetic body as recited in the above-described Invention 8,
wherein when an unexpected event is detected, the deterioration prediction model update step updates the deterioration prediction model based on the deterioration score at the plurality of time points after the detection of the unexpected event to acquire the updated deterioration prediction model.

Invention 10

The deterioration prediction method of a magnetic body as recited in the above-described Invention 8 or 9, further comprising:
- a step of preparing a deterioration prediction model including a set of deterioration scores calculated based on a sensor signal output from a sensor of the same type as the magnetic sensor each time a load is applied to a magnetic body of the same type as the magnetic body as the inspection target at a plurality of time points.

DESCRIPTION OF SYMBOLS

Magnetic sensor: 10
Magnetization magnet: 11
Excitation coil: 12
Excitation control unit: 13
Detection coil: 14
Detection coil: 15
Differential circuit: 16
Current-voltage conversion circuit: 17
CPU: 30
A/D converter: 31
I/D converter: 32
Non-volatile memory: 40
Deterioration score storage unit: 41
Deterioration prediction model storage unit: 42
Sensor signal storage unit: 43
Program storage unit: 50
Deterioration score calculation module: 51
Deterioration prediction model update module: 52
Deterioration score prediction module: 53
Tablet terminal: 80
Display: 81
Registration unit: 82
Transmitting/receiving unit: 90
Computer: 100
Sensor signal acquisition step: 210
Deterioration score calculation step: 220
Deterioration prediction model update step: 230
Deterioration score estimation step: 240
Elevator system: E
Elevator cage: E1
Winding machine: E2
Weight: E3
Typical deterioration prediction model: Mo
Updated deterioration prediction model: Ma
Wire rope: W

The invention claimed is:

1. A deterioration prediction device for a magnetic body, comprising:
   - a magnetic sensor configured to detect a magnetic field affected by a magnetic body as an inspection target and output a sensor signal;
   - a deterioration score calculation means configured to calculate a deterioration score indicating a degree of deterioration of the magnetic body, based on the sensor signal;
   - a deterioration score storage unit configured to store the deterioration score;
   - a deterioration prediction model storage unit configured to store a deterioration prediction model indicating a change in the degree of deterioration, the deterioration prediction model including a set of the deterioration scores calculated based on a sensor signal output from a sensor of the same type as the magnetic sensor by applying a load to a magnetic body of the same type as the magnetic body as an inspection target at a plurality of time points;
   - a deterioration prediction model update means configured to update a first deterioration prediction model based on the deterioration score at a plurality of time points to acquire an updated second deterioration prediction model, the first deterioration prediction model including a set of the deterioration scores calculated based on a sensor signal output from a sensor of the same type as the magnetic sensor by applying a load to a magnetic body of the same type as the magnetic body as an inspection target at a plurality of time points; and
   - a deterioration score prediction means configured to estimate a future deterioration score or a life of the magnetic body from the updated second deterioration prediction model.

2. The deterioration prediction device for a magnetic body as recited in claim 1,
wherein when the deterioration prediction model update means detects an unexpected event, the deterioration prediction model update means updates the first deterioration prediction model based on the deterioration score at a plurality of time points after the detection of the unexpected event to acquire the updated second deterioration prediction model.

3. The deterioration prediction device for a magnetic body as recited in claim 1,
wherein the magnetic body is a wire rope.

4. The deterioration prediction device for a magnetic body as recited in claim 1, further comprising:
   - a registration unit configured to register at least one of a target predetermined section of the magnetic body and the first deterioration prediction model.

5. The deterioration prediction device for a magnetic body as recited in claim 2, wherein the unexpected event includes at least one of an earthquake, a fire, a lightning strike, flooding, and maintenance.

6. The deterioration prediction device for a magnetic body as recited in claim 3,
wherein the magnetic sensor detects the magnetic field by a total magnetic flux method.

7. The deterioration prediction device for a magnetic body as recited in claim 3,
wherein the first deterioration prediction model includes a set of deterioration scores calculated based on a sensor signal output from a sensor of the same type as the magnetic sensor each time a load is applied to a wire rope of the same type as the wire rope at a plurality of time points.

8. A deterioration prediction method for a magnetic body, comprising:
a sensor signal acquisition step of acquiring a sensor signal by detecting a magnetic field affected by a magnetic body as an inspection target by a magnetic sensor;
a deterioration score calculation step of calculating a deterioration score indicating a degree of deterioration of the magnetic body, based on the sensor signal;
a pre-acquired first deterioration prediction model including a set of deterioration scores calculated based on a sensor signal output from a sensor of the same type as the magnetic sensor by applying a load to a magnetic body of the same type as the magnetic body as an inspection target at a plurality of time points;
a deterioration prediction model update step of updating the pre-acquired first deterioration prediction model indicating a change in the degree of deterioration, based on the deterioration score calculated by the deterioration score calculation step at a plurality of time points to acquire an updated second deterioration prediction model; and
a deterioration score estimation step of estimating a future deterioration score from the updated second deterioration prediction model.

9. The deterioration prediction method for a magnetic body as recited in claim 8,
wherein when an unexpected event is detected, the deterioration prediction model update step updates the first pre-acquired deterioration prediction model based on the deterioration score at the plurality of time points after the detection of the unexpected event to acquire the updated second deterioration prediction model.

* * * * *